(12) United States Patent
Rieger et al.

(10) Patent No.: US 8,215,877 B2
(45) Date of Patent: Jul. 10, 2012

(54) DEVICE FOR CONVEYING FLUID

(75) Inventors: Timo Rieger, Affalterbach (DE); Daniel Schrade, Constance (DE)

(73) Assignee: J. Wagner AG, Altstatten (CH)

( * ) Notice: Subject to any disclaimer, the term of this patent is extended or adjusted under 35 U.S.C. 154(b) by 314 days.

(21) Appl. No.: 12/030,916

(22) Filed: Feb. 14, 2008

(65) Prior Publication Data

US 2008/0205999 A1   Aug. 28, 2008

(30) Foreign Application Priority Data

Feb. 16, 2007 (EP) .................................. 07405048

(51) Int. Cl.
*B65G 53/58* (2006.01)
(52) U.S. Cl. ............. 406/96; 406/50; 406/127; 406/153
(58) Field of Classification Search .................... 406/96, 406/98, 50, 85, 127, 145, 151, 152, 153
See application file for complete search history.

(56) References Cited

U.S. PATENT DOCUMENTS

| | | | | |
|---|---|---|---|---|
| 3,254,924 A | * | 6/1966 | Harrison et al. ................. | 406/11 |
| 3,372,958 A | * | 3/1968 | Black .............................. | 406/15 |
| 3,861,830 A | * | 1/1975 | Johnson ......................... | 417/149 |
| 4,501,518 A | * | 2/1985 | Smith ............................. | 406/25 |
| 4,807,814 A | * | 2/1989 | Douche et al. ................ | 239/428 |
| 5,645,380 A | * | 7/1997 | Rutz .............................. | 406/153 |
| 5,906,858 A | * | 5/1999 | Huber et al. ................... | 427/180 |
| 6,598,803 B1 | * | 7/2003 | Haas et al. ...................... | 239/67 |
| 7,150,585 B2 | * | 12/2006 | Kleineidam et al. ............ | 406/50 |
| 7,163,359 B2 | | 1/2007 | Moser | |
| 7,241,080 B2 | * | 7/2007 | Klobucar et al. ................ | 406/50 |
| 7,287,964 B2 | * | 10/2007 | Sanwald ....................... | 417/397 |
| 7,410,329 B2 | * | 8/2008 | Simontacchi ................... | 406/98 |
| 7,465,130 B2 | * | 12/2008 | Herre et al. ..................... | 406/50 |
| 7,478,976 B2 | * | 1/2009 | Kleineidam et al. ............ | 406/50 |
| 7,481,605 B2 | * | 1/2009 | Kleineidam et al. ............ | 406/50 |
| 7,530,768 B2 | * | 5/2009 | Durr et al. ...................... | 406/151 |
| 2005/0158187 A1 | * | 7/2005 | Fulkerson et al. ............. | 417/390 |
| 2005/0207901 A1 | * | 9/2005 | Klobucar et al. ............... | 417/182 |
| 2006/0093442 A1 | * | 5/2006 | Kleineidam et al. ............ | 406/10 |
| 2006/0159565 A1 | * | 7/2006 | Sanwald ........................ | 417/395 |
| 2006/0193704 A1 | * | 8/2006 | Simontacchi ................... | 406/88 |

FOREIGN PATENT DOCUMENTS

| | | |
|---|---|---|
| DE | 103 00 280 A1 | 7/2004 |
| EP | 1 427 536 B1 | 6/2004 |

* cited by examiner

*Primary Examiner* — Gene Crawford
*Assistant Examiner* — William R Harp
(74) *Attorney, Agent, or Firm* — Renner, Otto, Boisselle & Sklar, LLP

(57) ABSTRACT

The device according to the invention for conveying fluid comprises a conveying chamber, an inlet valve, which is located in the direction of flow, upstream of the conveying chamber, and with an outlet valve, which is located in the direction of flow, downstream of the conveying chamber. Moreover, an injector is provided for, whose suction duct is connected with the conveying chamber. Via an air duct, which is connected to the conveying chamber, exhaust air (AL) can be blown into the conveying chamber.

11 Claims, 5 Drawing Sheets

000000
DEVICE FOR CONVEYING FLUID

This application claims priority under 35 U.S.C. §119(a) on Patent Application No. 07 405 048.5 filed in Europe on Feb. 16, 2007, the entire contents of which are herein incorporated by reference.

TECHNICAL FIELD

In order to coat objects or work pieces with coating powder, the coating powder or powder for short is transported out of a powder reservoir with the aid of a powder conveyor to a powder spray gun and there is applied with the powder spray gun to the work piece.

The invention relates to a device for conveying fluid which could, for example, be powder for coating work piece surfaces. The invention also concerns a method for operating the conveying device according to the invention.

BACKGROUND OF THE INVENTION

A device for transporting powder is known from the publication EP 1 427 536 B1. The conveying device includes a first conveying chamber and a second conveying chamber located parallel to it, whereby each of the conveying chambers is fitted with a feed line and a discharge line for the powder to be conveyed. Both discharge lines are connected together on the discharge side. While powder is sucked in via the feed line in the first conveying chamber, the powder from a previous work cycle being in the second conveying chamber is transported away via the discharge line. The conveyed powder in the first conveying chamber is subsequently transported away from the conveying chamber, while fresh powder is sucked into the second conveying chamber from the powder reservoir. The first conveying chamber creates, together with a drive unit and a piston, a pump. The second conveying chamber creates, together with a second drive unit and a second piston a second pump. Both pumps operate out of phase with each other but synchronously. This allows reduction of pulsing in the stream of powder flowing to the spray gun. However, as explained above, two pumps are necessary which leads to an increase in the installation space required and to a rather more complex construction. Also, since a range of driven mechanical parts are needed, the wear and the susceptibility to failure of the conveying device are not insubstantial.

A powder conveying device is known from the prior art DE 103 00 280 A1, which is also declared as a pumping system for powder. This pumping system consists of two mechanically synchronized membrane pumps which transport the coating powder alternately. Each of the membrane pumps is fitted with an inlet valve, a dosing chamber and an outlet valve. If the inlet valve is opened and a vacuum is generated in the dosing chamber with the aid of a disc-shaped membrane then powder is sucked into the dosing chamber. The inlet valve is then closed and the coating powder from the dosing chamber is blown out of the dosing chamber via the now opened outlet valve with the aid of compressed air which is blown into the dosing chamber. Movement of the membranes of the two membrane pumps takes place via a piston rod which connects the two membranes together. In this way, as the chamber volume of the first dosing chamber is increased with the aid of the membrane, the chamber volume of the second dosing chamber is automatically reduced. Such a conveying device for powder is complex to manufacture. It is also a considerably effort to control the drive, that is to say the piston rod. Just detecting the position of the piston rod requires four sensors. A further disadvantage is that the conveying device takes a lot of effort to be cleaned when a color change is made.

SUMMARY OF THE INVENTION

An object for the invention is to present a device for conveying fluid, which is simple to manufacture, which gets along with the least possible number of parts in motion, which has an adequately high suction capacity and which can be operated failure-free. The conveying device should also run, as far as possible, wear-free.

It would be advantageous if the device for conveying fluid could be simply and automatically cleaned with compressed air.

A further object for the invention is to indicate a method for operating the device according to the invention for conveying fluid.

The object is solved by a device for conveying fluid having the features described herein.

The device according to the invention for conveying fluid has a conveying chamber, an inlet valve, which is located in the direction of flow, upstream of the conveying chamber, and an outlet valve, which is located in the direction of flow, downstream of the conveying chamber. In addition, an injector is provided for, such injector having a suction duct connected to the conveying chamber. Exhaust air can be blown into the conveying chamber via an air duct which is also connected with the conveying chamber.

In the case of the method according to the invention for operating the device for conveying a fluid, the inlet valve is opened in one phase, the outlet valve is closed and the injector is supplied with injector nozzle air. The inlet valve is then closed in a further phase, the outlet valve is opened and exhaust air is blown into the conveying chamber.

Further advantageous embodiments of the invention arise from the characteristics described in the following embodiments.

In one embodiment of the device according to the invention for conveying a fluid the outlet of the injector is connected with the outlet of the outlet valve.

In another embodiment of the device according to the invention for conveying a fluid, there is a compressed air duct which is provided for the dosing air, such compressed air duct being connected to the outlet of the outlet valve. In this way, in case of need, additional air can be admixed to the powder stream.

In another embodiment of the device according to the invention for conveying a fluid, the air duct for the exhaust air is designed to open out into the conveying chamber in the inlet area of the conveying chamber. This offers the advantage that the powder present in the conveying chamber can be transported out of it using relatively little air. This increases the efficiency and reduces the amount of exhaust air required.

Furthermore, in the case of the device according to the invention for conveying a fluid, the air duct for the exhaust air can comprise a flow barrier for the fluid to be transported. This ensures that the fluid to be conveyed does not find its way into the air duct.

To solve the object it is suggested in addition that in the device according to the invention for conveying a fluid an insert is provided in order to increase the volume of the conveying chamber. This allows the conveying chamber, and therefore the whole conveying device, to be simply and economically adapted to meet a range of different requirements.

Advantageously, in the case of the device according to the invention for conveying a fluid, the inlet valve and/or outlet valve can comprise a pinch valve which can be driven by compressed air.

In another embodiment of the device according to the invention for conveying a fluid, the intake duct of the injector in the outlet area of the conveying chamber is connected with the conveying chamber.

It is also advantageous when the intake duct for the injector, in the case of the device according to the invention for conveying a fluid, meets the conveying chamber at an acute angle.

Advantageously, in the case of the device according to the invention for conveying a fluid, the injector comprises an injector nozzle which can be supplied with injector nozzle air via a connection.

In a further embodiment of the device according to the invention for conveying a fluid, the control connections for the inlet valve and outlet valve, the connection for the dosing air, the connection for the injector nozzle air and the connection for the exhaust air are located on one or both front faces of the conveying device. This means that a number of conveying devices can be arranged parallel to each other while taking up a minimum of installation space.

Advantageously, in the case of the device according to the invention for conveying a fluid, a non-return valve is provided for, which is attached to the dosing air duct.

In addition, a system for conveying fluid using the conveying device according to the invention is suggested. The system includes a control valve for the dosing air, a control valve for the exhaust air, a control valve for the injector nozzle air and a control unit for controlling the inlet valve, the outlet valve and the control valves.

In a further embodiment of the method according to the invention for operating the conveying device, the overall air quantity, which includes the exhaust air, the injector nozzle air and the dosing air, is held constant by the control unit.

The device according to the invention for conveying a fluid can finally be used to convey coating powder for coating work piece surfaces.

BRIEF DESCRIPTION OF THE DRAWINGS

The invention will be further described below on the basis of a number of example embodiments using five figures.

DETAILED DESCRIPTION OF THE DRAWINGS

Figure 1:
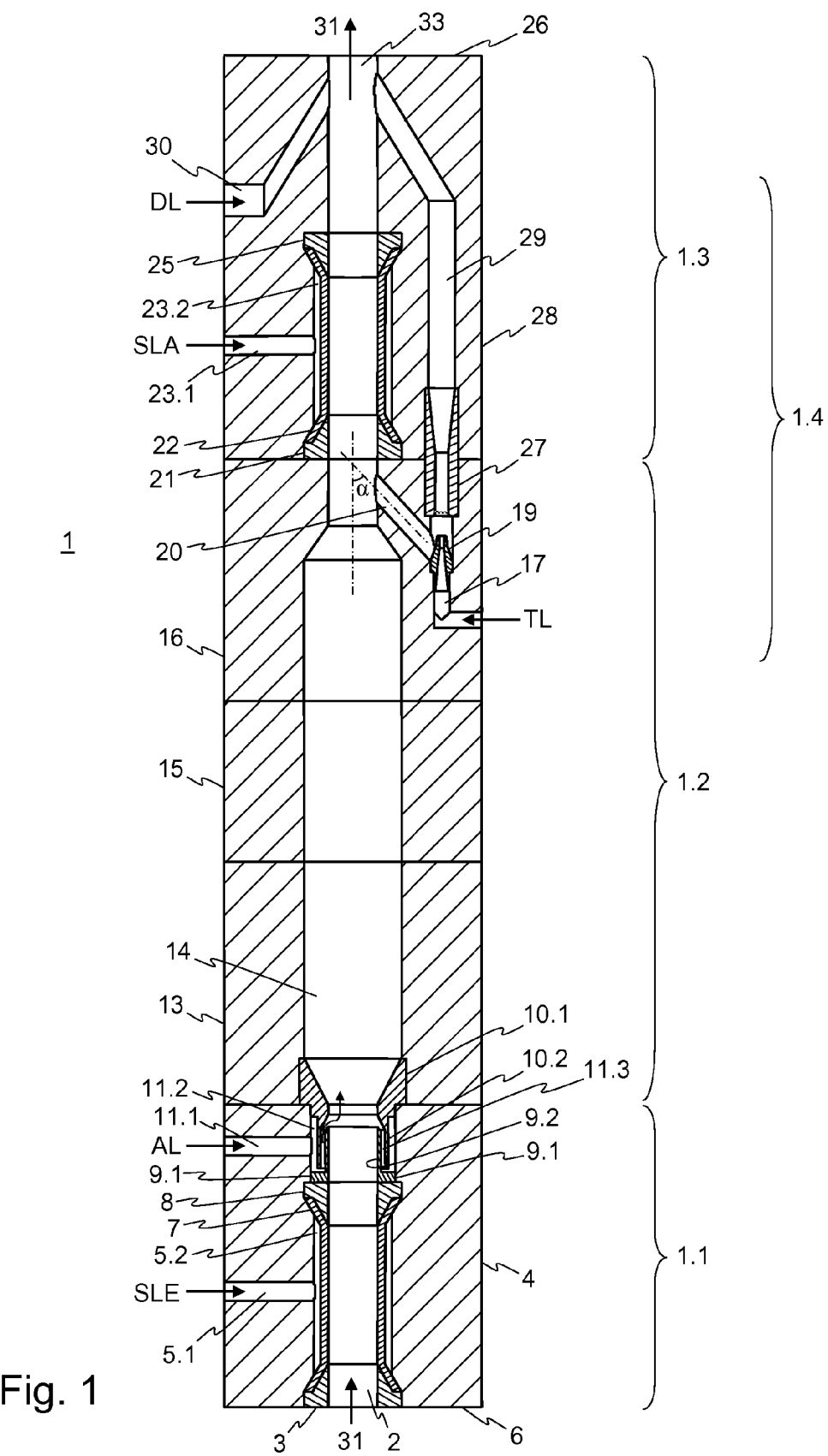
FIG. 1 shows a possible embodiment of the device according to the invention for conveying a fluid in a cross-section.

FIG. 1 shows a possible embodiment of the device according to the invention for conveying fluid in a cross-section. In the following coating powder is conveyed with the device. The conveying device is therefore also designated as powder conveyor 1. The powder conveyor 1 primarily comprises four components, namely an inlet valve 1.1, a conveying unit 1.2 located downstream of this in the direction of flow 31, an outlet valve 1.3 located downstream of the conveying unit 1.2 and an injector 1.4 which is located parallel to the outlet valve 1.3. An intake port is located on the upstream front face 6 of the powder conveyor 1 through which the powder can be sucked into an inlet duct 2.

The inlet valve 1.1 includes an inlet valve housing 4 in which there is a valve hose 7 which is held by means of a first cone 3 and of a second cone 8. A compressed air chamber 5.2 is located between the housing 4 and the outer shell of the valve hose 7, and such compressed air chamber 5.2 have compressed air applied to it via a compressed air duct 5.1. This compressed air is referred to, in the following, as control air SLE for the inlet valve 1.1. The valve hose 7, in the position shown in FIG. 1, is in a relaxed condition. The inlet valve 1.1 is opened and the powder can flow through the inlet duct 2. If the compressed air chamber 5.2 has the control air SLE applied to it via the compressed air duct 5.1, the valve hose 7 deforms in such a way that the inlet duct 2 is tapered in the cross-section. The valve hose 7 closes the inlet duct 2 if the pressure of the control air SLE is large enough, so that no further powder can flow into the powder chamber 14.

In the embodiment shown in FIG. 1, the conveyor unit 1.2 includes a first housing section 13, a second housing section 15, which is designated in the following also as the insert, and a third housing section 16. The three housing sections 13, 15 and 16 together make up the conveying chamber 14. It is also possible instead to make the conveying chamber 14 out of two housing sections or also just from one housing section. The housing section 15 is optional and can be placed between the two housing sections 13 and 16 to adapt the volume of the conveying chamber 14 to the required technical requirements. The conveying chamber 14 is primarily designed in a tubular form and tapers down in the downstream area. This is not technically essential however. It is also conceivable for the conveying chamber 14 to have the same cross-section along its whole length. The cross-section of the conveying chamber 14 can also be rectangular. However, the preferred form is round.

The outlet valve 1.3 is located downstream behind the conveyor unit 1.2. The outlet valve 1.3 is built to be functionally identical to the inlet valve 1.1. A valve hose 22 is held in the housing 28 of the outlet valve 1.3, between a first cone 21 and a second cone 25. A compressed air chamber 23.2 can have compressed air applied to it via a compressed air duct 23.1, such compressed air being designated in the following as control air SLA for the outlet valve 1.3.

The injector 1.4 is connected via a powder inlet duct 20 with the conveying chamber 14. The injector 1.4 includes a injector nozzle 19 which can be supplied with injector nozzle air TL via a compressed air duct 17. The fact that injector nozzle air TL flows out of the injector nozzle 19 means that a vacuum is generated in the inlet duct 20. The injector 1.4 operates on the Venturi principle. A receiver nozzle 27 is located downstream behind the injector nozzle 19 and it is followed by an exhaust duct 29, which, in turn, opens out into the powder duct 33. It is possible to generate a vacuum in the conveying chamber 14 with the aid of injector 1.4. The inlet duct 20 meets the conveying chamber 14 at an angle α. The angle α is preferably an acute angle.

Moreover, a compressed air duct 30 is located in the housing 28, which opens out into the powder duct 33. The so-called dosing air DL can be fed into the powder duct 33 via the compressed air duct 30. The amount of dosing air DL to be fed in depends on the desired total amount of air $Soll_{ges}$. The total amount of air is taken here as the sum of the dosing air DL, the injector nozzle air TL and the exhaust air AL.

A duct 11.1 is located in the housing, such duct 11.1 being connected via a second duct 11.2 and a duct 11.3 with the conveying chamber 14. The duct 11.3 is preferably designed as a flow barrier in order to prevent the powder finding its way into the ducts 11.2 and 11.1. The flow barrier can be designed as a throttle element or as a diaphragm. Exhaust air AL is blown over the ducts 11.1, 11.2 and 11.3 into the conveying chamber 14 in order to transport the powder present in the conveying chamber 14 out of chamber 14.

In the embodiment of the powder conveyor 1 shown in FIG. 1, the connections for the control air SLE, the exhaust air AL, the control air SLA and the dosing air DL as well as a connection for the injector nozzle air TL are located on the longitudinal sides of the conveying device 1. If a number of powder conveyors 1 should be arranged next to each other, then it is possible to place these connections on both front faces 6 and 26 of the powder conveyor 1.

Figure 2:
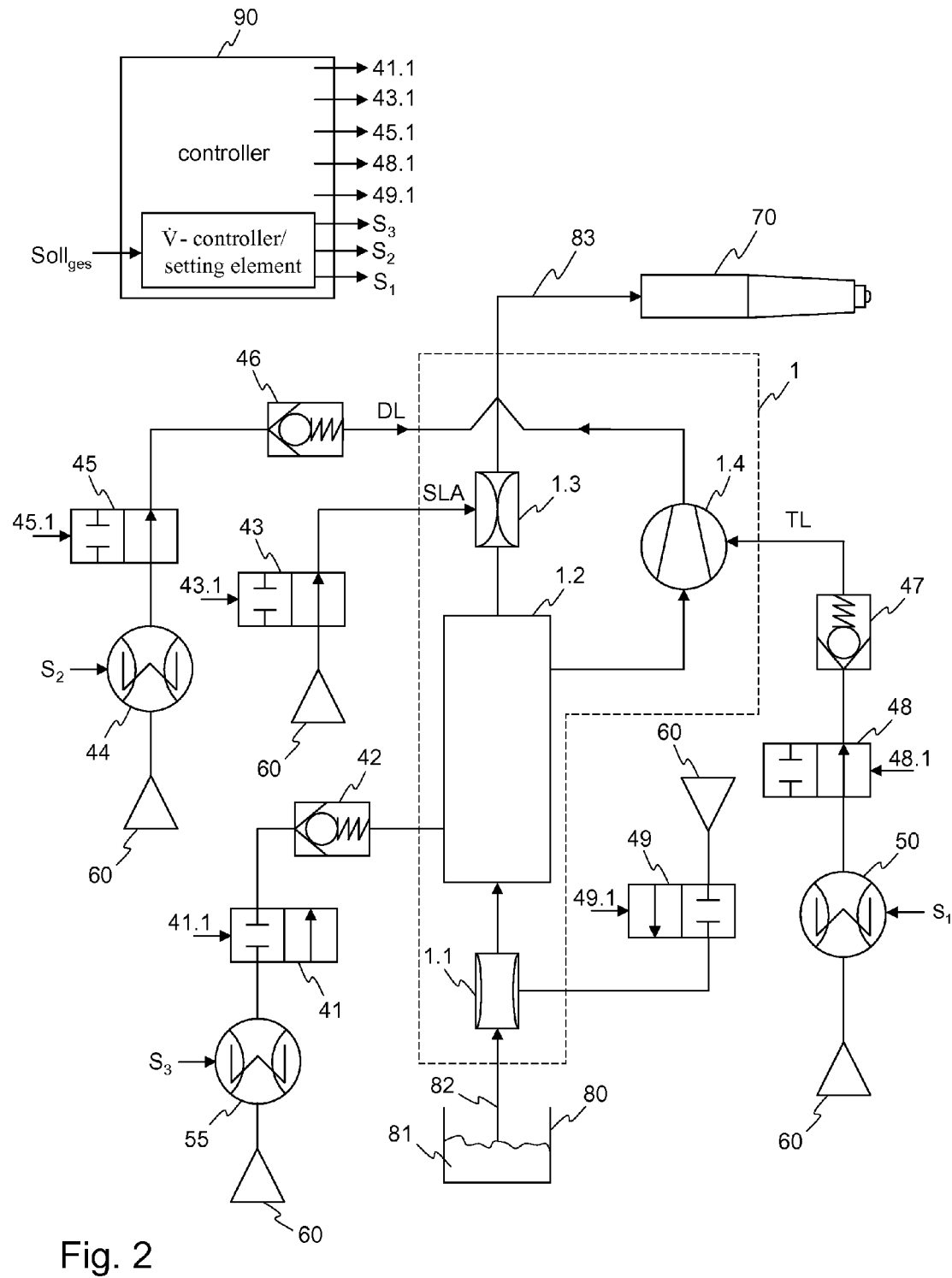
FIG. 2 shows a block diagram of the first embodiment of the conveyor system in a first operating condition.
Figure 3:
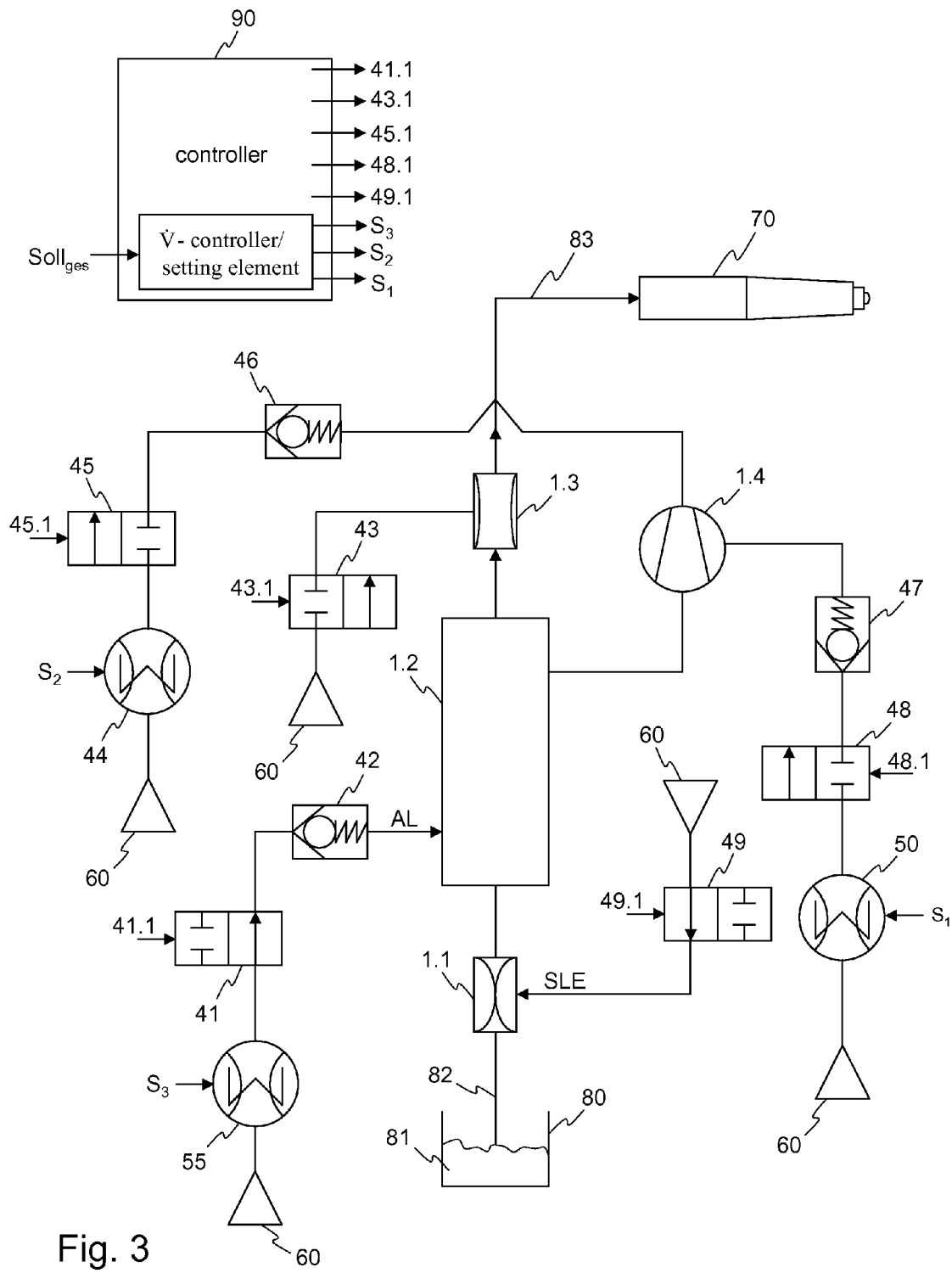
FIG. 3 shows a block diagram of the first embodiment of the conveyor system in a second operating condition.

A block diagram for a powder conveying system with the powder conveyor 1 in a first operating condition is shown in FIG. 2. The inlet valve 1.1 is opened in this operating condition. The inlet valve 1.1 is controlled via a control valve 49. If the control valve 49 is closed, as shown in FIG. 2, the control connection 49.1 of the inlet valves 1.1 does not have control compressed air SLE applied to it. The control valve 41 for the exhaust air AL is also closed so that no exhaust air AL passes into the conveying chamber 14 of the conveyor unit 1.2. The control valve 43, on the other hand, is opened so that the compressed air chamber 23.2 of the outlet valve 1.3 has control air SLA applied to it and the outlet valve 1.3 is closed. The control valve 48 is opened so that the injector 1.4 will have injector nozzle air TL applied to it. This causes a vacuum to be generated in the conveying chamber 14 of the conveyor unit 1.2. The control valve 45 for the dosing air DL is opened. Therefore, dosing air DL as well as injector nozzle air TL flow through the hose line 83, which connects the powder conveyor 1 with a coating gun 70. The non-return valves are designated with the reference signs 46, 42 and 47 and prevent the compressed air from flowing in the direction of the compressed air sources 60. A compressed air regulator 55 is located between the control valve 41 and the compressed air source 60, and a further compressed air regulator 44 is located between the control valve 45 and the compressed air source 60, and a third compressed air regulator 50 is located between the control valve 48 and the compressed air source 60. The three compressed air regulators 44, 50 and 55 as well as the control valves 41, 43, 45, 48 and 49 are connected with their control inputs S2, S1, S3, 41.1, 43.1, 45.1, 48.1 or 49.1 to a control unit 90. The control unit 90 takes on the control of the above-mentioned valves and provides the desired values S1, S2 and S3 for the three pressure regulators 44, 50 and 55. A flow volume regulator is installed for this purpose in the control unit 90, such flow volume regulator calculates three desired values S1, S2 and S3 from a desired value for the overall air current Sollges and passes these on to the three compressed air regulators 44, 50 and 55. In this first operating condition the powder 81 is sucked out of the powder reservoir 80 via the suction line 82 into the conveying chamber 14. The above-mentioned conveying system is shown in FIG. 3 in the form of a block diagram in a second operating condition. The inlet valve 1.1 is now closed so that no more powder can be sucked out of the powder reservoir 80 into the conveying chamber 14 of the conveyor unit 1.2. The outlet valve 1.3, on the other hand, is now opened. The control valve 41 is also opened so that exhaust air AL can be blown from the compressed air source 60 into the conveying chamber 14 of the conveyor unit 1.2. This causes the powder, which is in the conveying chamber 14, to be transported via the opened outlet valve 1.3 into the powder hose 83 and from there to the spray gun 70. The control valve 48 is closed in this operating condition so that no injector nozzle air TL passes to the injector 1.4. Control valve 45 is also closed so that there is also no dosing air DL passing into the hose 83. Once the conveying chamber 14 of the conveyor unit 1.2 has been blown out, a switch over takes place into the first operating condition according to FIG. 2. This allows a quasi-continuous powder flow to be generated and the gun 70 is continuously supplied with powder.

Figure 4:
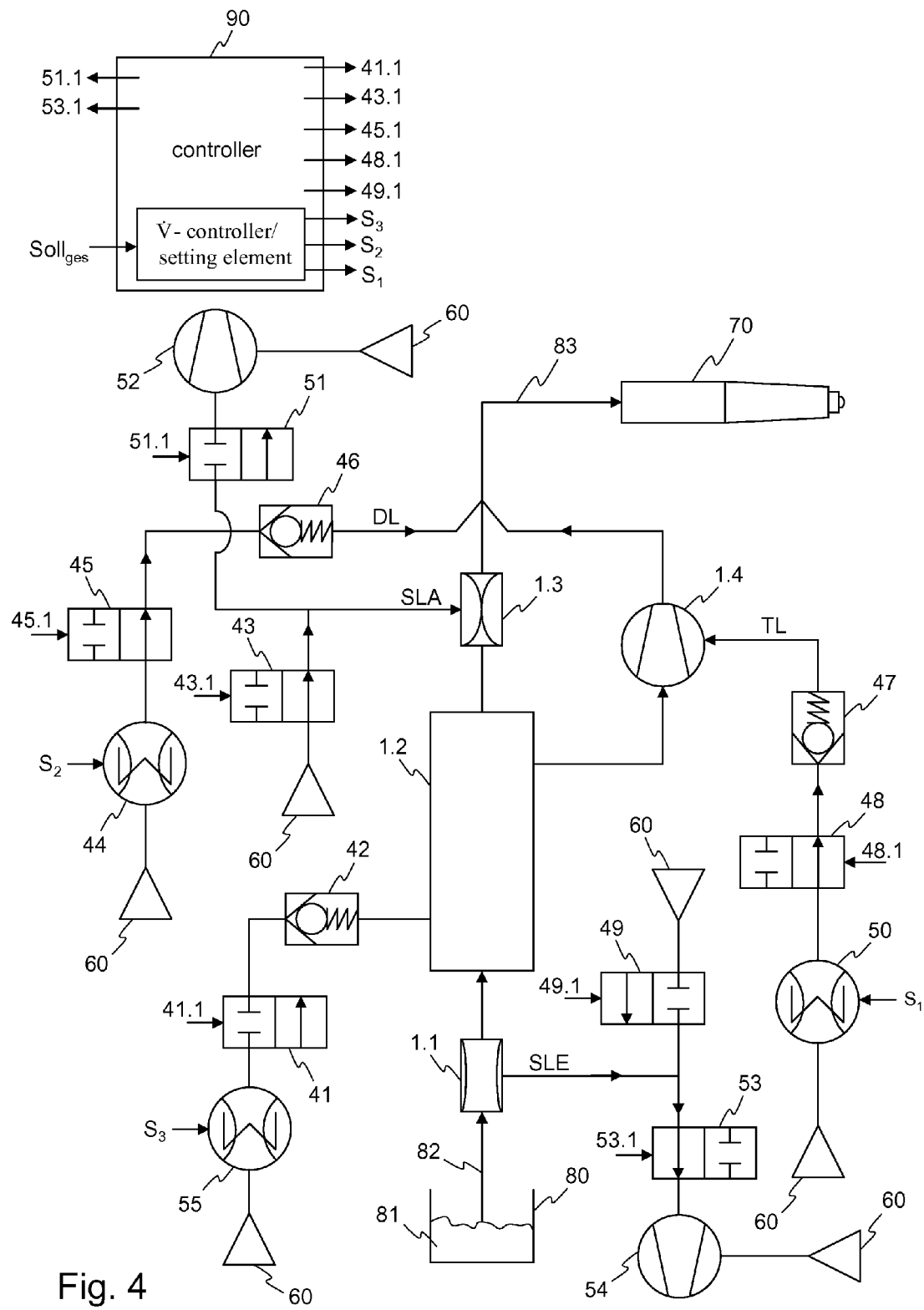
FIG. 4 shows a block diagram of a second embodiment of the conveyor system in a first operating condition.

In order to reduce the period of time required to open inlet valve 1.1 a source of vacuum can also be provided as shown in FIG. 4. The source of vacuum includes a vacuum generator 54 and is connected to the compressed air source 60. If the inlet valve 1.1 is opened, the control valve 49 is first closed, then the control valve 53 is opened and the air present in the pressure chamber 5.2 is sucked out by the vacuum generator 54.

Figure 5:
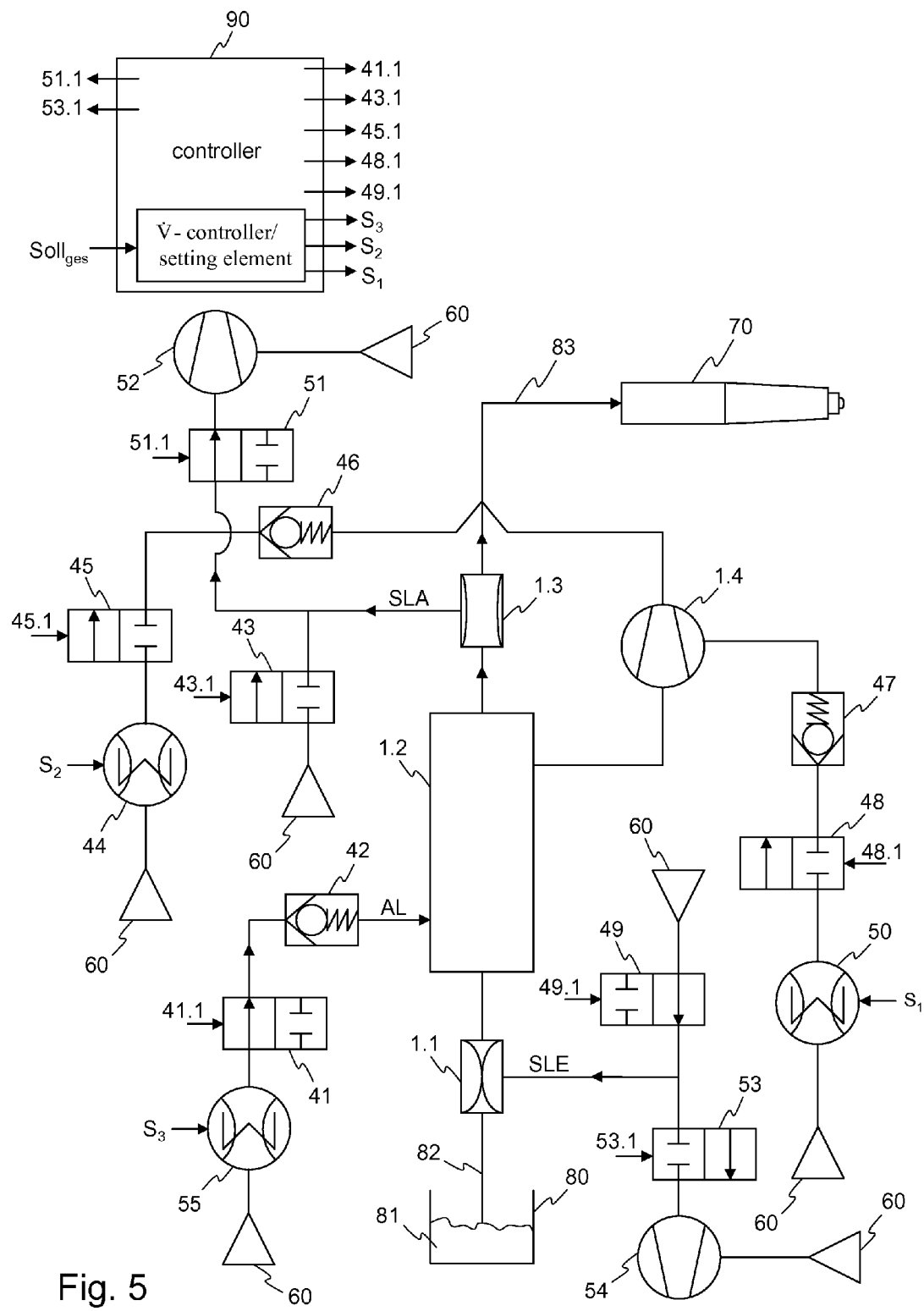
FIG. 5 shows a block diagram of a second embodiment of the conveyor system in a second operating condition.

The same applies for the outlet valve 1.3 in an analogous fashion. In order to reduce the period of time required to open outlet valve 1.3 a source of vacuum can be provided. The source of vacuum includes a vacuum generator 52 and is connected to the compressed air source 60. If the outlet valve 1.3 is opened, the control valve 43 is first closed, then the control valve 51 is opened and the air present in the compressed air chamber 23.2 is sucked out via the vacuum generator 52. This operating condition is shown in FIG. 5.

Material in powder form such as coating powder, flour or dust can be transported using the conveying device according to the invention.

One advantageous feature is that the device for conveying fluid with air can be simply and automatically cleaned. To do this the inlet valve 1.1 is first closed and the outlet valve 1.3 is opened and then exhaust air AL is blown through the annular gap 11.3 in the powder conveyor 1. It is also possible instead to clean the device by removing the suction line 82 from the powder container 80 and by blowing so-called flushing air into the powder conveyor 1 via the suction line 82 with the inlet valve 1.1 and outlet valve 1.3 open.

The preceding description of the embodiments according to the present invention is used only for illustrative purposes and not for the purpose of restricting the invention. Different alterations and modifications are possible within the framework of the invention without leaving the scope of the invention and its equivalents.

LIST OF REFERENCE SIGNS

1 Powder conveyor
1.1 Inlet valve
1.2 Conveying unit
1.3 Outlet valve
1.4 Injector
2 Inlet duct
3 Cone
4 Inlet valve housing
5.1 Compressed air duct
5.2 Compressed air chamber
6 Upstream front face
7 Valve hose
8 Cone
9.1 Insert
9.2 Sleeve
10.1 Cone
10.2 Sleeve
11.1 Compressed air duct section
11.2 Compressed air duct section
11.3 Annular gap
13 Conveying chamber housing
14 Conveying chamber
15 Conveying chamber housing
16 Housing of the conveying chamber and of the injector
17 Compressed air duct
19 Injector nozzle
20 Powder duct
21 Cone
22 Valve hose 23.1 Compressed air duct section
23.2 Compressed air duct section
25 Cone
26 Upstream front face
27 Receiver nozzle
28 Housing for the outlet valve and the injector
29 Powder duct
30 Compressed air duct
31 Conveying direction
33 Powder duct
41 Control valve
41.1 Control connection
42 Non-returning valve
43 Control valve
43.1 Control connection
44 Compressed air regulator
45 Control valve
45.1 Control connection
46 Non-returning valve
47 Non-returning valve
48 Control valve
48.1 Control connection
49 Control valve
49.1 Control connection
50 Compressed air regulator
51 Control valve
51.1 Control connection
52 Vacuum generator
53 Control valve
53.1 Control connection
54 Vacuum generator
55 Compressed air regulator
60 Compressed air source
70 powder spray gun
80 Powder reservoir
81 Powder
82 Suction line
83 Powder hose
90 Control unit
SLE Control air for the inlet valve
SLA Control air for the outlet valve
DL Dosing air
TL Injector nozzle air
AL Exhaust air
Sollges Desired value for overall air current
S1 Desired value
S2 Desired value
S3 Desired value
α Angle

The invention claimed is:

1. A device for conveying coating powder comprising:
a conveying chamber,
an inlet valve, which is located in the direction of flow, upstream of the conveying chamber,
an outlet valve, which is located in the direction of flow, downstream of the conveying chamber,
an injector, including a suction duct which is permanently connected to the conveying chamber in an outlet area of the conveying chamber and an injector outlet which is connected to an outlet of the outlet valve, and
an air duct, which is connected to the conveying chamber, so that exhaust air (AL) can be blown into the conveying chamber,
wherein the air duct for the exhaust air (AL) opens into the conveying chamber in an entry area of the conveying chamber, and
wherein the inlet valve and the outlet valve are pinch valves driven by compressed air.

2. The device according to claim 1,
further comprising a compressed air duct for dosing air (DL), and the compressed air duct is connected with the outlet of the outlet valve.

3. The device according to claim 2,
wherein the injector comprises an injector nozzle, which is provided with injector nozzle air (TL) via a connection.

4. The device according to claim 3, further comprising a controller including control connections of the inlet valve and outlet valve, the control connections including a control connection for the dosing air (DL), a control connection for the injector nozzle air (TL) and a control connection for the exhaust air (AL) located on a front face of the device for conveying fluid.

5. A system for conveying fluid comprising the device according to claim 4, wherein:
the control connection for the dosing air includes a control valve for the dosing air,
the control connection for the exhaust air includes a control valve for the exhaust air,
the control connection for the injector nozzle air includes a control valve for injector nozzle air, and
the controller controls the inlet valve, the outlet valve and the control valves.

6. The device according to claim 2,
further comprising a non-return valve, which is connected to the compressed air duct for the dosing air (DL) to prevent return flow of the dosing air.

7. The device according to claim 1,
wherein the air duct comprises a flow barrier for the coating powder to be conveyed.

8. The device according to claim 1,
wherein an insert is provided in order to increase the volume of the conveying chamber.

9. The device according to claim 1,
wherein the suction duct of the injector meets the conveying chamber at an acute angle (α).

10. A method for operating a device for conveying coating powder comprising:
in a first phase, opening an inlet valve connected to a conveying chamber and closing an outlet valve connected to the conveying chamber,
conveying the coating powder into the conveying chamber,
providing an injector in an outlet area of the conveying chamber with injector nozzle air (TL) through a suction duct which is permanently connected to the conveying chamber to create a vacuum in the conveying chamber, wherein the injector nozzle air TL flows through an injector outlet which is connected to an outlet of the outlet valve,
in a further phase, closing the inlet valve and opening the outlet valve, and blowing exhaust air (AL) into the conveying chamber to convey the coating powder out of the conveying chamber
wherein the exhaust air (AL) is blown into an entry area of the conveying chamber, and
wherein the inlet valve and the outlet valve are driven by compressed air.

11. The method according to claim 10, further comprising: holding constant by means of a controller the overall amount of air, which comprising the exhaust air (AL), the injector nozzle air (TL) and dosing air (DL).

* * * * *